May 6, 1941. C. A. WILLIAMS 2,241,229
CULINARY UTENSIL AND METHOD OF MAKING THE SAME
Filed May 31, 1939

Inventor:
CHESTER A. WILLIAMS
By Owen W. Kennedy
Attorney

Patented May 6, 1941

2,241,229

UNITED STATES PATENT OFFICE 2,241,229

CULINARY UTENSIL AND METHOD OF MAKING THE SAME

Chester A. Williams, Worcester, Mass., assignor to The Washburn Company, Worcester, Mass., a corporation of Massachusetts Application May 31, 1939, Serial No. 276,550

10 Claims. (Cl. 210—161)

The present invention relates to culinary utensils, such as strainers, colanders and the like, in which a metallic bowl is attached around its rim to a suitable handle.

The object of the invention is to provide an improved utensil construction and method of producing the same, whereby the bowl and handle parts are integrally united to form a rigid structure, particularly adapted to stand up under the extreme service conditions to which utensils of this character are usually subjected. Briefly stated, the invention resides in providing a preformed handle portion of thermoplastic material, and in uniting the same by heat and pressure to a metallic strainer or colander bowl, so as to form an assembly, having its parts firmly and inseparably united. The above and other advantageous features of the invention will hereinafter more fully appear from the following description considered in connection with the accompanying drawing, in which—

Figure 1:
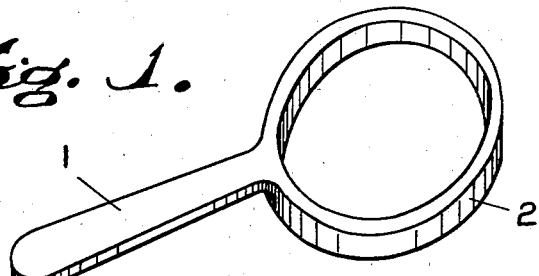
Figs. 1 and 2 are perspective views of the handle and metallic bowl which are to be united.
Figure 2:
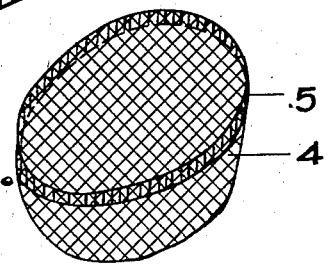
Figure 3:
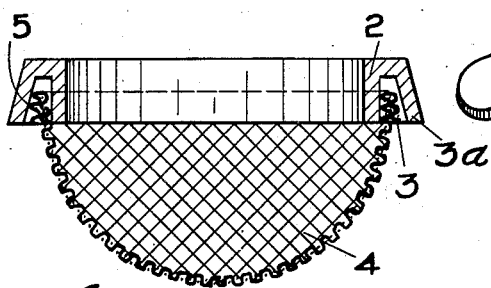
Fig. 3 is a transverse sectional view of the handle of Fig. 1, with the bowl of Fig. 2 assembled therein.

Referring to the drawing, a handle 1 terminates in an annular portion 2 which, as shown in Fig. 3, on an enlarged scale, provides a groove 3 with its outer wall 3a flared outwardly. A strainer bowl 4 is illustrated in Fig. 2, as being formed of wire mesh, with the open rim of the bowl being turned over on itself to provide a lip 5. If desired, the bowl 4 can be formed of pressed metal with perforations, instead of the wire mesh, as in a colander.

The handle 1 is preferably preformed of thermoplastic material by a molding operation, in which the material is injected under pressure into cooperating dies. The thermoplastic material employed has the characteristic of being rendered plastic or semi-plastic, upon the application of heat considerably higher than any degree of heat to which the complete utensil is liable to be subjected under ordinary conditions of domestic use.

Figures 4, 5:
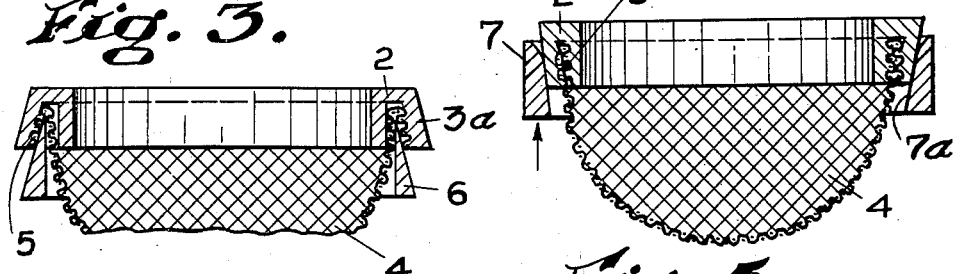
Fig. 4 illustrates the initial step of uniting the elements of Fig. 3 by the application of heat.
Fig. 5 illustrates the final step in the assembly of the elements.

The first step in making the utensil, consists in assembling the bowl and handle, with the rim of the bowl 4 received in the open groove 3 of the annular portion 2, as indicated in Fig. 3. With the parts so assembled, it is evident that the groove 3 is of such width as to loosely receive the lip 5 of the bowl 4. With the handle 1 held stationary after insertion of the bowl rim in the groove 3, a heated tool 6 is then introduced, which serves to not only force the rim of the bowl to the bottom of the groove 3, but also serves to force the lip 5 outwardly into engagement with the outer wall 3a of the groove 3. The temperature of the tool 6 is such as to render that portion of the wall 3a with which it comes into contact, somewhat plastic, so that the mesh of the lip 5 is embedded in the thermoplastic material. Therefore, when the tool 6 is withdrawn, the bowl 4 remains held in place within the annular handle portion 2, as shown in Fig. 4.

The final step resides in subjecting the annular portion 2 of the handle to heat of such degree as to render it somewhat plastic, after which a compressing tool 7 is brought to bear on the outside wall 3a. As best shown in Fig. 5, the tool 7 is in the form of a ring having a tapered inner wall 7a, so that relative movement between the handle portion 2 and the tool 7, as indicated by the arrow in Fig. 5, results in compressing the wall 3a of the groove inwardly into close engagement with the bowl 4. This results in completely confining the rim and lip of the bowl within the groove 3, with the mesh of the bowl firmly embedded in the material of the wall 3a, due to the plastic condition of the material when the wall is contracted upon the bowl.

Figure 6:
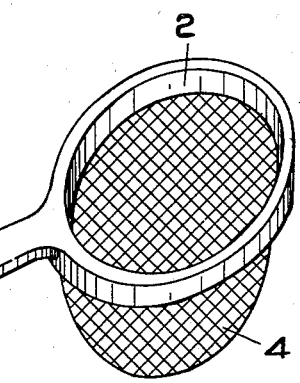
Fig. 6 is a perspective view of a completed utensil.

The completed utensil then appears as shown in Fig. 6, from which it is apparent that the practise of the invention has resulted in the production of a substantially unitary structure. It has been found that the utensil is particularly well adapted for the uses to which culinary utensils of this character are subjected, since the handle itself presents a smooth surface over all, which does not collect particles of food, so that the utensil can be thoroughly washed and kept in a sanitary condition. Furthermore, it has been found that the extremely tight joint between the rim of the bowl and the walls of the groove of the handle ring, effectively prevents the entrance of moisture, so that there is no substantial deterioration of the rim portion of the bowl.

I claim:

1. An article of the class described, comprising a metallic bowl, and a handle providing a nonmetallic ring for receiving the rim of said bowl, and united thereto by the compression of said ring.

2. An article of the class described, comprising a metallic bowl, and a handle providing a non-metallic ring having a groove for receiving the rim of said bowl, and united thereto by compression of the walls of said groove.

3. An article of the class described, comprising a metallic bowl having a turned-over lip around its rim, and a handle providing a non-metallic ring having a groove for receiving the lip of said bowl, with said lip embedded in the material forming the walls of said groove.

4. An article of the class described, comprising a metallic bowl and a handle providing a ring of thermoplastic material having a groove, with the rim of said bowl received in said groove and united thereto by compression of the walls of said groove.

5. A method of making a utensil, which consists in uniting a metallic bowl, and a handle providing a non-metallic ring, by embedding the rim of said bowl in said ring through the application of heat and pressure.

6. A method of making a utensil, which consists in assembling a metallic bowl and a handle providing a ring of thermoplastic material, next heating said ring material to render it plastic, and then embedding the rim of said bowl in said heated material by the application of pressure.

7. A method of forming a utensil, which consists in uniting a metallic bowl and a handle providing a grooved ring of thermoplastic material, by inserting the rim of said bowl into the groove of said ring, accompanied by the application of pressure while said ring is in a heated plastic condition.

8. An article of the class described, comprising a metallic bowl and a non-metallic bowl supporting ring having a groove for receiving the rim of said bowl, and united thereto by compression of the walls of said groove.

9. An article of the class described, comprising a metallic bowl having a turned-over lip around its rim and a bowl supporting ring of thermoplastic material having a groove for receiving the lip of said bowl, with said lip embedded in the material forming the walls of said groove by compression of said walls.

10. A method of forming a utensil, which consists in uniting a metallic bowl and a grooved ring of thermoplastic material, by inserting the rim of said bowl into the groove of said ring, accompanied by the application of pressure while said ring is in a heated plastic condition, to embed the rim of said bowl in the walls of the ring groove.

CHESTER A. WILLIAMS.